US007749310B2

(12) United States Patent
Lagerstedt et al.

(10) Patent No.: US 7,749,310 B2
(45) Date of Patent: Jul. 6, 2010

(54) DEVICE AND METHOD FOR CLEANING A CENTRIFUGAL SEPARATOR

(75) Inventors: Torgny Lagerstedt, Dobelnsgatan (SE); Claes Inge, Kristinavagen (SE); Peter Franzen, Bergakungsvagen (SE); Olev Maehans, Platslagarvagen (SE); Martin Sandgren, Odelbergs Vag (SE)

(73) Assignee: 3Nine AB, Nacka Strand (SE)

( * ) Notice: Subject to any disclaimer, the term of this patent is extended or adjusted under 35 U.S.C. 154(b) by 700 days.

(21) Appl. No.: 10/592,645

(22) PCT Filed: Feb. 23, 2005

(86) PCT No.: PCT/SE2005/000250

§ 371 (c)(1), (2), (4) Date: Jun. 5, 2007

(87) PCT Pub. No.: WO2005/087384

PCT Pub. Date: Sep. 22, 2005

(65) Prior Publication Data

US 2007/0295364 A1 Dec. 27, 2007

(30) Foreign Application Priority Data

Mar. 16, 2004 (SE) .................................... 0400650

(51) Int. Cl.
*B01D 45/12* (2006.01)

(52) U.S. Cl. ............................. 95/270; 95/281; 96/228; 96/229; 96/230; 96/281; 96/282; 55/406

(58) Field of Classification Search ................... 95/281, 95/270; 96/228, 229, 230, 281, 282; 55/406
See application file for complete search history.

(56) References Cited

U.S. PATENT DOCUMENTS

| | | | | |
|---|---|---|---|---|
| 2,788,008 A | | 4/1957 | Wanzer | |
| 3,358,413 A | * | 12/1967 | Kalika | 96/282 |
| 4,242,109 A | * | 12/1980 | Edwards | 96/282 |
| 5,017,203 A | * | 5/1991 | Cox et al. | 55/457 |
| 5,104,371 A | | 4/1992 | Ajnefors | |
| 6,080,090 A | | 6/2000 | Taylor et al. | |
| 6,451,093 B1 | * | 9/2002 | Miles | 95/270 |

(Continued)

OTHER PUBLICATIONS

GB 2121325, Filtration and Separation Products, Dec. 21, 1983.

(Continued)

*Primary Examiner*—Jason M Greene
*Assistant Examiner*—Dung Bui
(74) *Attorney, Agent, or Firm*—Thompson & Knight LLP; James J. Murphy

(57) ABSTRACT

The invention relates to devices and methods for cleaning centrifugal separators for concurrent and countercurrent separation of solid and/or liquid particles suspended in gaseous media. The device comprises a rotor (12) which is provided with a multiplicity of sedimentation members (14) and which is mounted rotatably in a surrounding housing (20). In concurrent separation, a flushing nozzle (36) is arranged upstream of the sedimentation members (14) in order to supply a cleaning liquid for flushing the sedimentation members clean. In countercurrent separation, the flushing nozzle is arranged upstream and/or downstream of the sedimentation members in order to supply cleaning liquid from outside and/or from inside the rotor for flushing the sedimentation members clean.

13 Claims, 2 Drawing Sheets

U.S. PATENT DOCUMENTS

| | | | | |
|---|---|---|---|---|
| 6,627,166 | B1 * | 9/2003 | Simon | 423/210 |
| 7,597,732 | B2 * | 10/2009 | Yokota et al. | 55/406 |
| 2004/0237792 | A1 * | 12/2004 | Hallgren et al. | 96/281 |
| 2005/0198932 | A1 * | 9/2005 | Franzen et al. | 55/406 |
| 2007/0163215 | A1 * | 7/2007 | Lagerstadt | 55/406 |

OTHER PUBLICATIONS

DE 10153483, SMS DEMAG AG, May 15, 2003.

GB 296670, An Improved Method of Operting Centrifugal Separators, Aktiebolag Separator, May 28, 1929.

* cited by examiner

DEVICE AND METHOD FOR CLEANING A CENTRIFUGAL SEPARATOR

TECHNICAL FIELD

The present invention relates to devices and methods for cleaning centrifugal separators.

More specifically, the present invention relates to devices and methods for cleaning centrifugal separators for concurrent and countercurrent separation of solid and/or liquid particles suspended in gaseous media, the device comprising a rotor which is provided with a multiplicity of sedimentation members and which is mounted rotatably in a surrounding, stationary housing. In concurrent separation, the device comprises an intake provided for the gaseous medium to be cleaned and leading to a central inlet shaft of the rotor, the housing having, on the one hand, an outlet for cleaned gas which has been freed of solid and/or liquid particles on passage through the sedimentation members in the rotor, and, on the other hand, an outlet for the solid and/or liquid particles which have deposited on the sedimentation members and are then transferred to a side wall of the housing by a centrifugal force. In countercurrent separation, the device likewise comprises a rotor provided with a multiplicity of sedimentation members and mounted rotatably in a surrounding, stationary housing, but in this case the inlet for the gaseous medium to be cleaned is arranged in the housing, while the central shaft of the rotor forms an outlet shaft for discharging the gaseous medium which has been cleaned on passage through the sedimentation members.

BACKGROUND OF THE INVENTION

Centrifugal separators of the abovementioned kind are often used for cleaning gases of the solid and/or liquid particles contained in them. A problem which may arise in operating these separators is that a build-up of particles develops on the rotating and fixed components of the separator. Liquid particles too can dry in and leave residues. The problem of build-up and deposits can be a serious one in centrifuges in which the sedimentation members are in the form of conical plate or disc elements stacked tightly on top of one another. In these centrifuges, it is desired to have the disc surface oriented as far as possible at right angles to the G forces in order to achieve the highest possible efficiency of cleaning. In this case, however, it is difficult for the particles to slide off the disc surface. The receiving space in the housing surrounding the rotor can also be difficult to clean of remaining collections of particles.

SUMMARY OF THE INVENTION

A first object of the invention is to propose devices which can efficiently clean centrifugal separators of the abovementioned type in situ, without having to dismantle them.

Another object of the invention is to propose corresponding methods for efficient cleaning of centrifugal separators of the abovementioned type.

The invention is described more closely in the following detailed description, in which reference is made to the attached drawings.

DETAILED DESCRIPTION OF PREFERRED EMBODIMENTS

Figure 1:
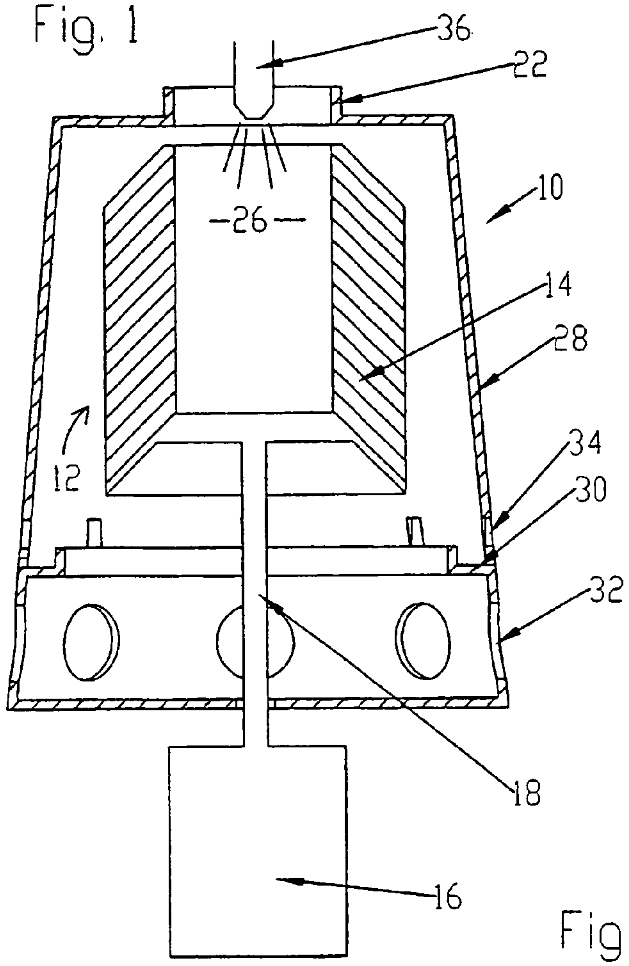
FIG. 1 is a diagrammatic side view of a first embodiment of a device according to the present invention.

In FIG. 1, reference number 10 designates a centrifugal separator according to the invention for separating solid and/or liquid particles suspended in gaseous media, for example for cleaning air which contains an oil mist or other very fine particles. The centrifugal separator 10 comprises a rotor 12 with a number of sedimentation members mounted thereon in the form of insert plates 14. The insert plates 14, on which solid and/or liquid particles suspended in the gas will be deposited by sedimentation, can be in the form shown in FIG. 1, namely conical disc elements stacked one on another, separated by a small spacing axially. The rotor 12 is driven by a motor 16 via a shaft 18. A stationary, conically shaped housing 20 surrounds the rotor 12 and has a connection neck 22 for an intake for the gas to be cleaned. The connection neck 22 lies directly in front of a central inlet shaft 26 of the rotor 12.

On its inside, the side wall 28 of the housing 20 can have a radially inwardly directed annular flange or screen 30 at a level slightly below the bottom end of that part of the rotor 12 containing the insert plates 14. Below the screen 30, outlet openings 32 for the cleaned gas are formed in the side wall 28. At a distance above the screen 30, outlet holes 34 for the solid particles or liquid separated from the gas are formed in the side wall 28 of the housing 20. These holes 34 can be formed radially or tangentially in the direction of swirling of the gas in the housing. The outlet holes 34 can have a circular cross-sectional shape or can be formed as slit-like openings of elongate cross section whose main direction extends axially, as is shown in FIG. 2.

In the first embodiment of the device according to the present invention shown in FIG. 1, which device operates according to the concurrent principle, a nozzle 36 for delivery of a flushing liquid is arranged in the gas intake of the centrifugal separator 10, that is to say upstream of the central inlet shaft 26 of the rotor 12. During operation, the gas which is to be cleaned flows into the central inlet shaft 26 in the rotor 12, after which the particles in the gas are caused to deposit on the insert plates 14 as the gas flows out radially from the rapidly rotating rotor 12. The deposited particles then slide outwards along the plates 14 and are finally thrown across onto the surrounding, stationary housing wall 28 by centrifugal forces. As will be seen clearly from FIG. 2, in which the rotor is not shown, the axial and tangential flow of the gas in the housing gives the solid and/or liquid particles a helical direction of flow along the inside of the housing wall 28, droplets or rivulets of liquid or solid particles being formed, as indicated by arrows in FIG. 2, and being collected and discharged through outlet holes 34.

During operation, a build-up of particles sometimes develops on rotating and fixed components of the separator. When it is necessary to clean the rotating components, primarily on the conical sedimentation elements 14 and the axial rods (not shown) on which these are fitted, and on the inside of the stationary housing 20 surrounding the rotor 12, washing liquid is delivered briefly during operation, in a quantity which in terms of magnitude is substantially greater than the flow of liquid/particles separated out during operation.

Figure 2:
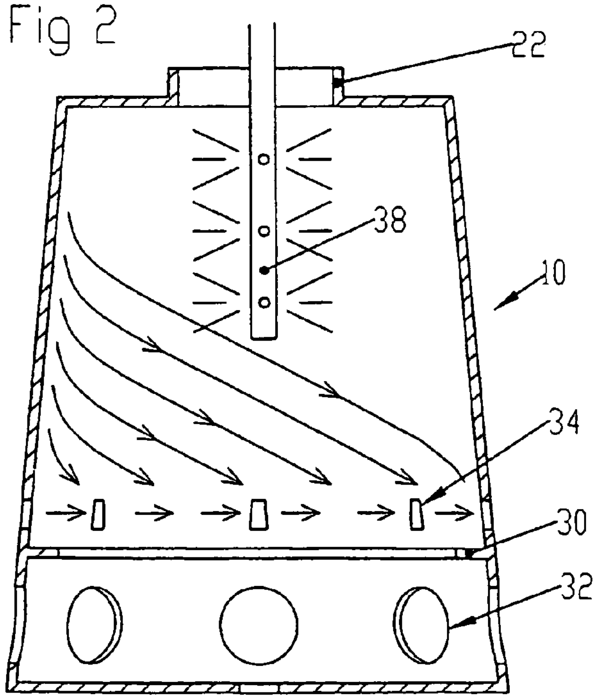
FIG. 2 is a diagrammatic side view of a second embodiment of a device according to the invention.

In FIG. 2, which shows a second embodiment of the cleaning device according to the invention, the washing liquid nozzle is in the form of an elongate pipe 38 placed in the central shaft of the rotor. The rotor is not shown in FIG. 2. The pipe-shaped nozzle 38 has a multiplicity of outlet openings for flushing liquid arranged in its longitudinal direction, so that this liquid can be evenly distributed over the components of the rotor. Like the first embodiment, this one is suitable for concurrent separation, but it can also be used for countercurrent separation. In the latter case, when the stream of gas during operation flows from inside the housing 20 and into the central shaft of the rotor via the gaps between the disc elements, the flow of gas through the separator is interrupted or at least substantially reduced when the washing liquid is sprayed out of the nozzle pipe 38.

In concurrent separation in the embodiments according to FIGS. 1 and 2, flushing liquid can also be supplied continuously in a reduced flow to the stream of gas, in order to achieve improved transport characteristics for separated particles on the sedimentation discs 14.

Figure 3:
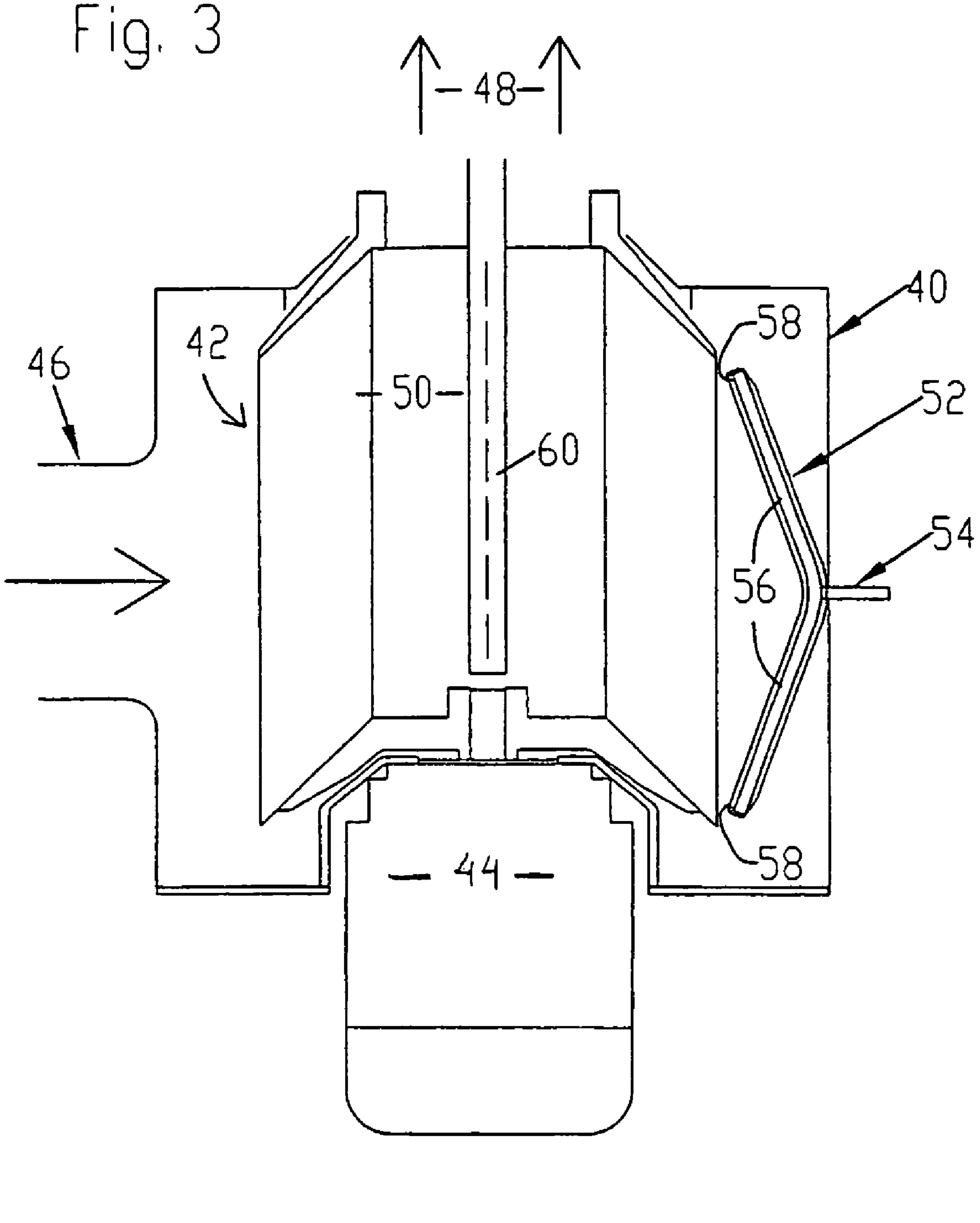
FIG. 3 is a third embodiment of a device according to the invention.

FIG. 3 shows a third embodiment of the device according to the invention, intended for countercurrent separation. The device comprises a housing 40 in which a centrifuge rotor 42 of the type mentioned above is rotatably mounted and is driven by a motor 44. The housing 40 has a gas inlet 46 for unclean gas, and a gas outlet 48 for cleaned gas, downstream of the central shaft 50 of the rotor 42, passes through an upper part of the housing 40. At its lower part, the housing 40 has an outlet (not shown) for separated liquid and particles. In this embodiment, a rotatable flushing nozzle 52 can be arranged outside the axial long side of the rotor 42. The nozzle 52 has a hub 54 which is mounted in a side wall of the housing 40, and two arms 56 (or at least one arm) projecting from the hub, with an outlet opening 58 at the outer end of the arm. Upon rotation of the arms 56 via a drive device (not shown), the flushing liquid flowing out of the openings 58 can sweep across the entire outer peripheral surface of the rotor 42 in order to flush the latter clean during operation. This embodiment can also be combined with a central pipe nozzle 60 in the central shaft 50 in the rotor 42, as has been described above.

The invention claimed is:

1. Centrifugal separator device for concurrent separation of solid and/or liquid particles suspended in gaseous media, comprising a rotor which is provided with a multiplicity of sedimentation members and which is mounted rotatably in a surrounding, stationary housing, an intake provided for the gaseous medium to be cleaned and leading to a central inlet shaft of the rotor, the housing having, on the one hand, an outlet for cleaned gas which has been freed of solid and/or liquid particles on passage through the sedimentation members in the rotor, and, on the other hand, an outlet for the solid and/or liquid particles which have deposited on the sedimentation members and are then transferred to a side wall of the housing by a centrifugal force, characterized in that a flush nozzle is arranged upstream of the sedimentation members in order to supply a cleaning liquid for flushing clean the sedimentation members and other internal rotating and fixed elements on which solid particles have built up during operation of the separator.

2. Device according to claim 1, characterized in that the nozzle is arranged in the intake, upstream of the central inlet shaft in the rotor.

3. Device according to claim 1, characterized in that the nozzle is composed of an elongate pipe element which extends axially through the central inlet shaft of the rotor and has a multiplicity of outlet openings distributed in the longitudinal direction for flushing liquid.

4. Centrifugal separator device for countercurrent separation of solid and/or liquid particles suspended in gaseous media, comprising a rotor which is provided with a multiplicity of sedimentation members and which is mounted rotatably in a surrounding, stationary housing which has, on the one hand, an inlet for the gaseous medium to be cleaned, and, on the other hand, an outlet for solid and/or liquid particles which have deposited on the sedimentation members and are then transferred to a side wall of the housing by centrifugal forces, the rotor having an outlet which leads from a central outlet shaft of the rotor and is provided for the gaseous medium which has been cleaned on passage through the sedimentation members, characterized in that a flush nozzle is arranged downstream of the sedimentation members in order to supply from inside a cleaning liquid for flushing clean the sedimentation members and other internal rotating and fixed elements on which solid particles have built up during operation of the separator.

5. Device according to claim 4, characterized in that the nozzle is composed of an elongate pipe element which extends axially through the central outlet shaft of the rotor and has a multiplicity of outlet openings distributed in the longitudinal direction for flushing liquid.

6. Centrifugal separator device for countercurrent separation of solid and/or liquid particles suspended in gaseous media, comprising a rotor which is provided with a multiplicity of sedimentation members and which is mounted rotatably in a surrounding, stationary housing which has, on the one hand, an inlet for the gaseous medium to be cleaned, and, on the other hand, an outlet for solid and/or liquid particles which have deposited on the sedimentation members and are then transferred to a side wall of the housing by centrifugal forces, the rotor having an outlet which leads from a central outlet shaft of the rotor and is provided for the gaseous medium which has been cleaned on passage through the sedimentation members, characterized in that at least one flushing nozzle is arranged upstream of the sedimentation members in order to supply from outside of the rotor a cleaning liquid for flushing clean the sedimentation members and other internal rotating and fixed elements on which solid particles have built up during operation of the separator.

7. Device according to claim 6, characterized in that the nozzle is rotatable and comprises a hub arranged in the housing, and at least one arm which projects radially from the hub and which is provided with at least one nozzle orifice directed towards the rotor and designed to sweep across the whole peripheral surface of the rotor during rotation.

8. Method for cleaning internal rotating and fixed elements of a centrifugal separator for concurrent separation of solid and/or liquid particles suspended in gaseous media, which separator comprises a rotor provided with a multiplicity of sedimentation members and mounted rotatably in a surrounding, stationary housing, an intake provided for the gaseous medium to be cleaned and leading to a central inlet shaft of the rotor, the housing having, on the one hand, an outlet for cleaned gas and, on the other hand, an outlet for solid and/or liquid particles separated from the sedimentation members, characterized in that, when cleaning is required, a flushing liquid is supplied to the gaseous medium upstream of the sedimentation members.

9. Method according to claim 8, characterized in that the flushing liquid is supplied briefly and intermittently in a large flow, in order to intensively flush the rotating and fixed elements of the centrifugal separator from inside.

10. Method according to claim 8, characterized in that the flushing liquid is supplied continuously in a reduced flow to the stream of gas, in order to achieve improved transport characteristics for separated particles on the sedimentation members.

11. Method for cleaning internal rotating and fixed elements of a centrifugal separator for countercurrent separation of solid and/or liquid particles suspended in gaseous media, which separator comprises a rotor provided with a multiplicity of sedimentation members and mounted rotatably in a surrounding, stationary housing which has, on the one hand, an outlet for the gaseous medium to be cleaned, and, on the other hand, an outlet for solid and/or liquid particles which have deposited on the sedimentation members and are then transferred to a side wall of the housing by centrifugal forces, the rotor having an outlet which leads from a central outlet shaft of the rotor and which is provided for the gaseous medium which has been cleaned on its passage through the sedimentation members, characterized in that, when cleaning is required, a flushing liquid is sprayed onto the sedimentation members of the rotor from the downstream side of the latter.

12. Method according to claim 11, characterized in that the stream of gas through the separator is interrupted or at least substantially reduced, and in that flushing liquid is supplied briefly in a large flow, in order to intensively flush the rotating and fixed elements of the centrifugal separator.

13. Method for cleaning internal rotating and fixed elements of a centrifugal separator for countercurrent separation of solid and/or liquid particles suspended in gaseous media, which separator comprises a rotor provided with a multiplicity of sedimentation members and mounted rotatably in a surrounding, stationary housing which has, on the one hand, an inlet for the gaseous medium to be cleaned, and, on the other hand, an outlet for solid and/or liquid particles which have deposited on the sedimentation members and are then transferred to a side wall of the housing by centrifugal forces, the rotor having an outlet which leads from a central outlet shaft of the rotor and which is provided for the gaseous medium which has been cleaned on passage through the sedimentation members, characterized in that, when cleaning is required, a flushing liquid is added to the gaseous medium upstream of the sedimentation members of the rotor.

* * * * *